(12) United States Patent
Kinouchi et al.

(10) Patent No.: US 7,523,951 B2
(45) Date of Patent: Apr. 28, 2009

(54) WHEEL SUSPENSION ARM MOUNTING STRUCTURE OF VEHICLE

(75) Inventors: Sosuke Kinouchi, Kakogawa (JP); Kazuhiro Maeda, Akashi (JP)

(73) Assignee: Kawasaki Jukogyo Kaisha, Kobe-Shi (JP)

( * ) Notice: Subject to any disclaimer, the term of this patent is extended or adjusted under 35 U.S.C. 154(b) by 69 days.

(21) Appl. No.: 11/488,151

(22) Filed: Jul. 18, 2006

(65) Prior Publication Data

US 2007/0018419 A1 Jan. 25, 2007

(30) Foreign Application Priority Data

Jul. 19, 2005 (JP) ............................. P2005-208849

(51) Int. Cl.
*B60G 3/04* (2006.01)
(52) U.S. Cl. .............................................. 280/124.134
(58) Field of Classification Search .......... 280/124.134, 280/124.144, 124.135, 124.143; 180/311, 180/9.25, 218
See application file for complete search history.

(56) References Cited

U.S. PATENT DOCUMENTS 3,767,223 A * 10/1973 Bottenberg ................. 280/788
2004/0021286 A1* 2/2004 Bombardier et al. .. 280/124.134

FOREIGN PATENT DOCUMENTS

JP 6-86230 11/1994

* cited by examiner

*Primary Examiner*—Faye M. Fleming
(74) *Attorney, Agent, or Firm*—Wenderoth, Lind & Ponack, L.L.P.

(57) ABSTRACT

A wheel suspension arm mounting structure of a vehicle in which a suspension arm is mounted to a vehicle body frame member so as to freely swing upward and downward. The wheel suspension arm mounting structure includes a suspension arm support shaft provided on a base of the suspension arm so as to rotate relatively with respect to the suspension arm, a mounting boss provided on the suspension arm support shaft, and a bolt insertion hole provided on the mounting boss. The bolt insertion hole is formed so that a bolt can be inserted in the direction perpendicular to an axis of the suspension arm support shaft, such that the suspension arm support shaft is fixed to an arm mounting portion provided on the vehicle body frame member by the bolt inserted into the insertion hole.

6 Claims, 13 Drawing Sheets

Front

WHEEL SUSPENSION ARM MOUNTING STRUCTURE OF VEHICLE

BACKGROUND OF THE INVENTION

1. Field of the Invention

The present invention relates to a wheel suspension arm mounting structure of a vehicle in which a suspension arm for supporting a wheel of the vehicle is mounted to a vehicle body frame member so as to freely swing upward and downward.

2. Description of the Related Art

A suspension arm of a suspension apparatus of a vehicle is generally mounted to an arm mounting portion of a vehicle body frame member via a suspension arm support shaft so as to freely swing upward and downward. This is disclosed in a Japanese Examined Patent Publication No. 06-86230.

FIG. 17 is a plan view showing a mounting structure for right and left suspension arms 302 of a conventional straddle-type four-wheeled vehicle. FIG. 18 is a left side sectional view showing clearly the shape of an arm mounting bracket 303 illustrated in FIG. 17. In FIG. 17, a pair of front arm mounting brackets 303, and a pair of rear arm mounting brackets 303 are welded to both the right and left surfaces of a vehicle body frame member 301 which is arranged at the center of a vehicle along the width direction. The right and left suspension arms 302 are formed in A-shape (or V-shape), as seen in plan view. Four cylindrical base portions 310 are welded to front and rear arm members 302a, 302b of the suspension arms 302 respectively, and are rotatably mounted to the arm mounting brackets 303 via bearings 311 and suspension arm support shafts 305.

The bearing 311 which is arranged inside the base portion 310 of the front arm member 302a is a needle type bearing. An inner race 320 of the needle type bearing 311 is fitted on the arm support shaft 305 and is utilized as a spacer in a front and rear direction. The bearing 311 which is arranged inside the base portion 310 of the rear arm members 302b is a pillow-ball type bearing.

As shown in FIG. 18, the mounting bracket 303 has a hat-shape when viewed from the side, and is welded to a side face of the vehicle body frame member 301. Insertion holes 304 for the suspension arm support shaft 305 are formed in front and rear walls 303a, 303b of the mounting bracket 303.

In FIG. 17, each of the suspension arm support shafts 305 has a head 305a and a rear end male screw portion so as to function as a bolt and a shaft. Each of the suspension arm support shafts 305 is inserted in the insertion holes 304 in the front and rear walls 303a, 303b, and is clamped by the head 305a of the suspension arm support shaft (the bolt) 305 and nut 306 which is screwed on the rear male screw portion of the suspension arm support shaft 305, thereby the suspension arm support shaft 305 is fixed in the front and rear direction.

When the arm mounting structure shown in FIG. 17, is assembled, first, each of the base portions 310 of the suspension arms 302 is inserted into each of the mounting brackets 303 from the right side, left side or upper side; second, each of the suspension arm support shafts 305 is inserted into the insertion holes 304 of each of the mounting brackets 303 from the front side; and finally, each of the nuts 306 is screwed on the rear male screw portions of the arm support shafts 305 from the rear side.

As mentioned above, assembling the suspension arms 302 by inserting the arm support shafts 305 from front side requires a wide or large working space or area in front of the mounting brackets 303. However, it is difficult to obtain a wide or large working space in front of the mounting bracket 303 since various parts of the vehicle are arranged in front of the mounting brackets 303. As a result, the assembly work becomes difficult. For example, it is necessary to position the base 310 of the suspension arm 302 and the insertion holes 304 of the mounting bracket 303 on the same axis when the arm support shaft 305 is inserted into the insertion holes 304 and inside of the bearing 311.

In addition, since a heavy tensile load is applied to the suspension arm 302 during swinging, it is necessary to strongly weld the mounting bracket 303 to the side surface of the vehicle body frame member 301. In particular, when a light alloy member such as aluminum is utilized for the vehicle frame member 301 to reduce the weight of the vehicle, for the sake of strength improvement, it is necessary to provide a long weld at a connecting portion between the vehicle body frame member 301 and the mounting bracket 303 by lengthening a section of the mounting bracket 303. However, the weight of the vehicle body frame member increases.

SUMMARY OF THE INVENTION

The present invention addresses the above mentioned condition, and an objective of the present invention is to provide a wheel suspension arm mounting structure of a vehicle in which the supporting strength of a suspension arm or the like is high, assembling is easy, and an assembling property improves.

In order to achieve the objectives mentioned above, in accordance with the present invention, there is provided a wheel suspension arm mounting structure of a vehicle in which a suspension arm for supporting a wheel of the vehicle is mounted to a vehicle body frame member so as to freely swing upward and downward comprising: a suspension arm support shaft provided on a base of the suspension arm so as to allow a rotation of the base of the suspension arm, a mounting boss provided on the suspension arm support shaft, a bolt insertion hole defined in the mounting boss, and an arm mounting portion provided on the vehicle body frame member, wherein the bolt insertion hole is formed so that a bolt can be inserted in the direction perpendicular to an axis of the suspension arm support shaft, such that the suspension arm support shaft is fixed to the arm mounting portion by the bolt inserted into the insertion hole.

In accordance with the structure mentioned above, it is possible to insert the bolt in the same direction as the attaching direction of the suspension arm (the direction of the vehicle body width) when assembling the suspension arm. For example, with respect to the arm mounting portion of the vehicle body frame member which extends in the front to rear direction, the bolt is inserted into the mounting portion from the right or left side of the vehicle width, and the base of the suspension arm is clamped on both the right and the left sides, thereby the suspension arm is mounted to the vehicle body frame member so as to freely swing upward and downward. Therefore, in accordance with the structure mentioned above, it becomes easy to obtain a wide or large work space for assembling, it is easy to assemble the suspension arm, and the assembling property improves.

In addition, since the bolt is inserted in the direction perpendicular to the axis of the suspension arm support shaft and is fixed to the arm mounting portion of the vehicle body frame member, in comparison with a conventional structure in which the suspension arm support shaft serves as a bolt is inserted from the front, the suspension arm of the present invention can be strongly fixed to the vehicle body frame member.

In the wheel suspension arm mounting structure of the vehicle, preferably the mounting boss may be integrally formed with the suspension arm support shaft.

In accordance with the structure mentioned above, it is possible to reduce the number of the parts of the vehicle, and strongly support the suspension arm support shaft.

In the wheel suspension arm mounting structure of the vehicle, preferably the suspension arms may be arranged on both the right and left sides of the vehicle body frame member, the arm mounting portion may traverse the vehicle body frame member, and may be fixed to the vehicle body frame member so that both ends of the arm mounting portion may project from both side surfaces of the vehicle body member respectively. Each of the suspension arm support shafts may be mounted on each of the side end surfaces of the arm mounting portion respectively.

In accordance with the structure mentioned above, when heavy tensile loads are applied to the right and left suspension arms, the tensile loads offset each other via the arm mounting member which is commonly utilized for the right and left suspension arms, and the affect upon the vehicle body frame member is reduced. Thereby, the load applied to vehicle body frame member is reduced, and the mounting structure can carry a heavy load. In particular, when the vehicle body frame member is made of a light alloy such as aluminum, it is possible to reduce the weight of the vehicle body frame member even more.

In the suspension arm mounting structure of the vehicle, preferably the arm mounting portion may be made of a cylindrical member having a penetrating hole for the bolt.

In accordance with the structure mentioned above, it is possible to prevent increasing of the weight of the vehicle body frame member.

In the suspension arm mounting structure of the vehicle, preferably a bearing may be provided between the base of the suspension arm and the suspension arm support shaft, and an outer peripheral surface of the suspension arm support shaft may be utilized as an inner race of the bearing.

In accordance with the structure mentioned above, the suspension arm can smoothly swing upward and downward by means of the bearing, and a part for an inner race of the bearing is not required. Thus, the number of the parts for the bearing can be reduced.

BRIEF DESCRIPTION OF THE DRAWINGS

The above and other objects, features and advantages of the present invention will become more apparent from the following description taken in connection with the accompanying drawings.

DETAILED DESCRIPTION OF THE INVENTION

[Outline of Vehicle]

Figure 1:
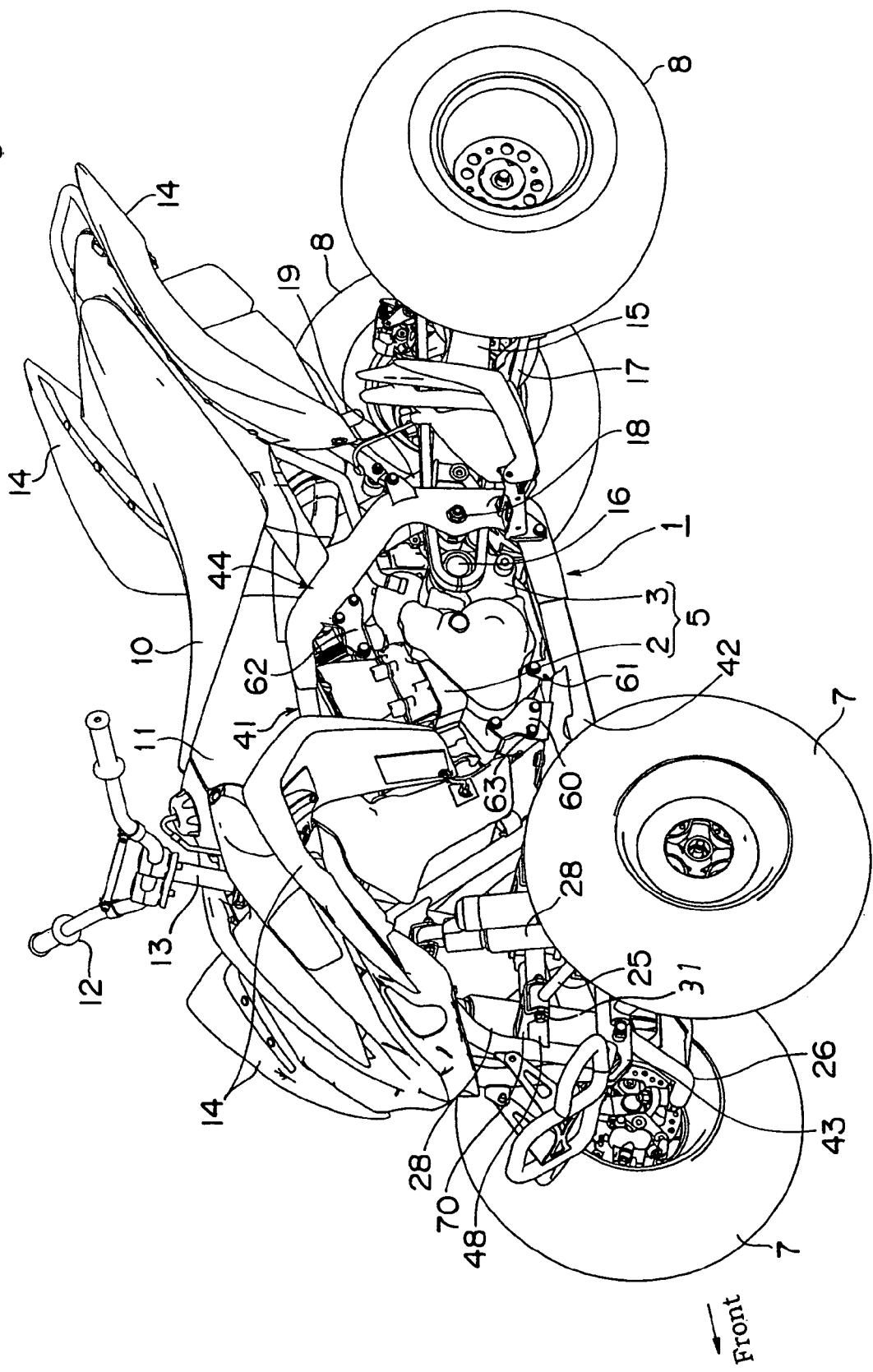
FIG. 1 is a perspective view showing an embodiment of a straddle-type four wheeled vehicle for a rough ground provided with a wheel suspension arm mounting structure in accordance with the present invention.

FIGS. 1 to 12 show the first embodiment of a straddle-type four wheeled vehicle of a sport type for a rough ground in accordance with the present invention. In FIG. 1, showing a perspective view of the four wheeled vehicle, a power unit 5 of the vehicle comprises an engine 2, a transmission including a transmission case 3, and the like. The power unit 5 is arranged within a body frame 1, and is supported on the body frame 1 via a plurality of engine brackets 60, 61 and 62. A front portion of the body frame 1 is provided with a pair of right and left front wheels 7; a rear portion of the body frame 1 is provided with a pair of right and left rear wheels 8; and an upper portion of the body frame 1 is provided with a straddle-type seat 10, a fuel tank 11, a steering handle 12 and the like. An upper side of the front wheels 7 and the rear wheels 8 is provided with fenders 14 and the like, respectively. The steering handle 12 is fixed to an upper end of a steering shaft 13 which extends downwardly.

The rear wheels 8 are supported by a rear end of a swing arm 15. A front end of the swing arm 15 is supported by a support portion 18 of the body frame 1 so as to freely swing upward and downward. A lower end of a rear shock absorber 19 is connected to a middle portion of the swing arm 15 via a link mechanism (not shown). Rotation of a crank shaft (not shown) of the engine 2 is transmitted to an output sprocket 16 of the transmission through a clutch (not shown) and the transmission mechanism within the transmission case 3, and is transmitted to the rear wheels 8 from the output sprocket 16 via a drive chain 17 or the like.

A main portion of the body frame 1 is integrally provided with a pair of right and left upper frame members 41, a pair of right and left lower frame members 42, a single front frame member 43 connecting front ends of the lower frame members 42 and front ends (front lower ends) of the upper frame members 41, a pair of right and left bracket members 44 connecting rear ends of the upper frame members 41 and rear ends of the lower frame members 42, and upper and lower cross members respectively connecting upper ends of right and left bracket members 44 to each other and lower ends thereof to each other. All of the members 41, 42, 43 and 44 mentioned above are made of a light alloy such as an alloy including aluminum.

Figure 2:
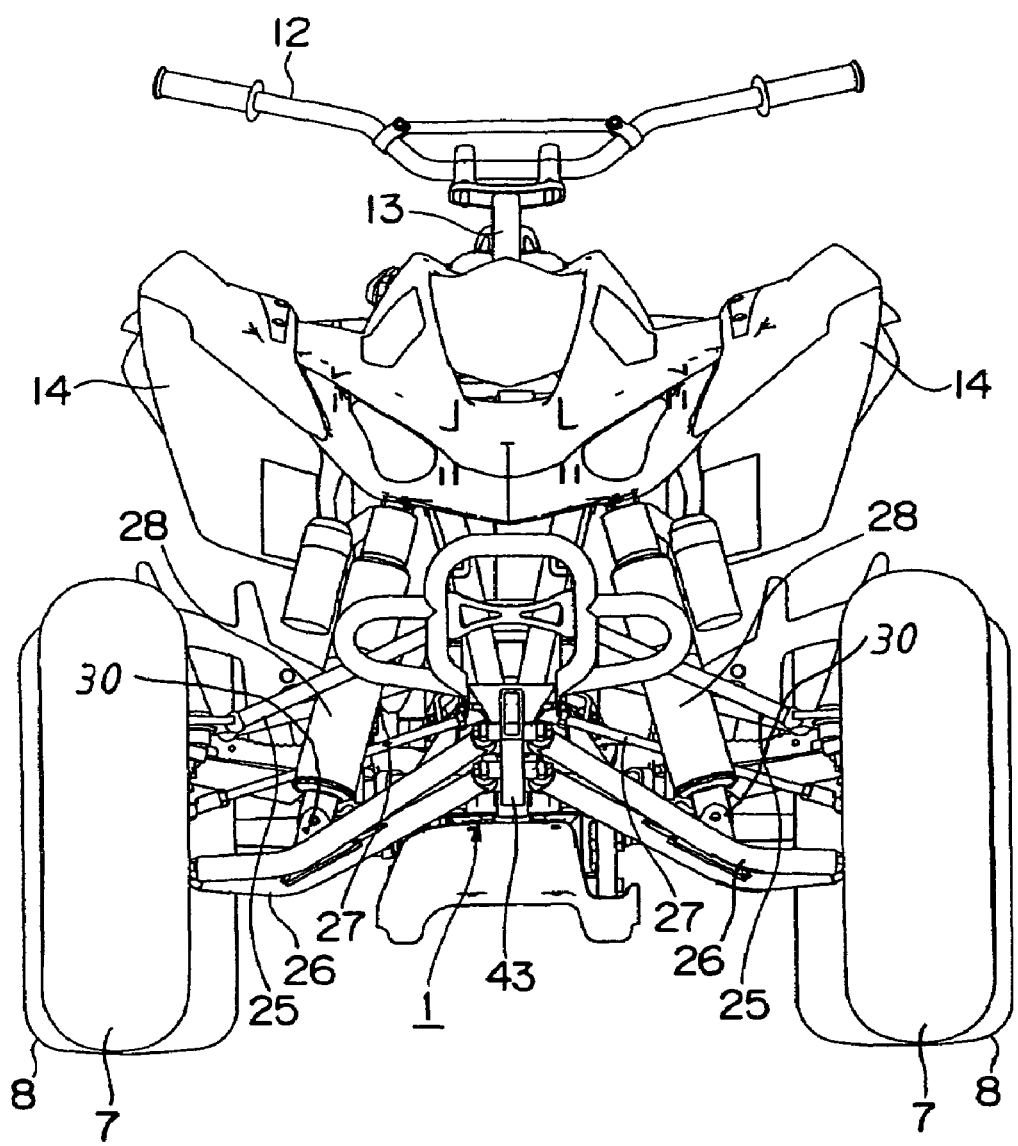
FIG. 2 is a front view of the four wheeled vehicle in FIG. 1.

FIG. 2 is a front view of the four wheeled vehicle. In this embodiment, the right and left front wheels 7 are suspended from the body frame 1 via a double wishbone type suspension so as to be independent. In other words, the right and left front wheels 7 are respectively supported on the body frame 1 by a pair of upper and lower A-shaped (or V-shaped) suspension arms 25 and 26 so as to freely swing upward and downward. Lower ends of front shock absorbers 28 are connected to the middle portions of the right and left lower suspension arms 26. Further, the right and left front wheels 7 are connected to the steering shaft 13 in an interlocking manner via a tie rod or the like so as to be freely steered right and left.

Figure 3:
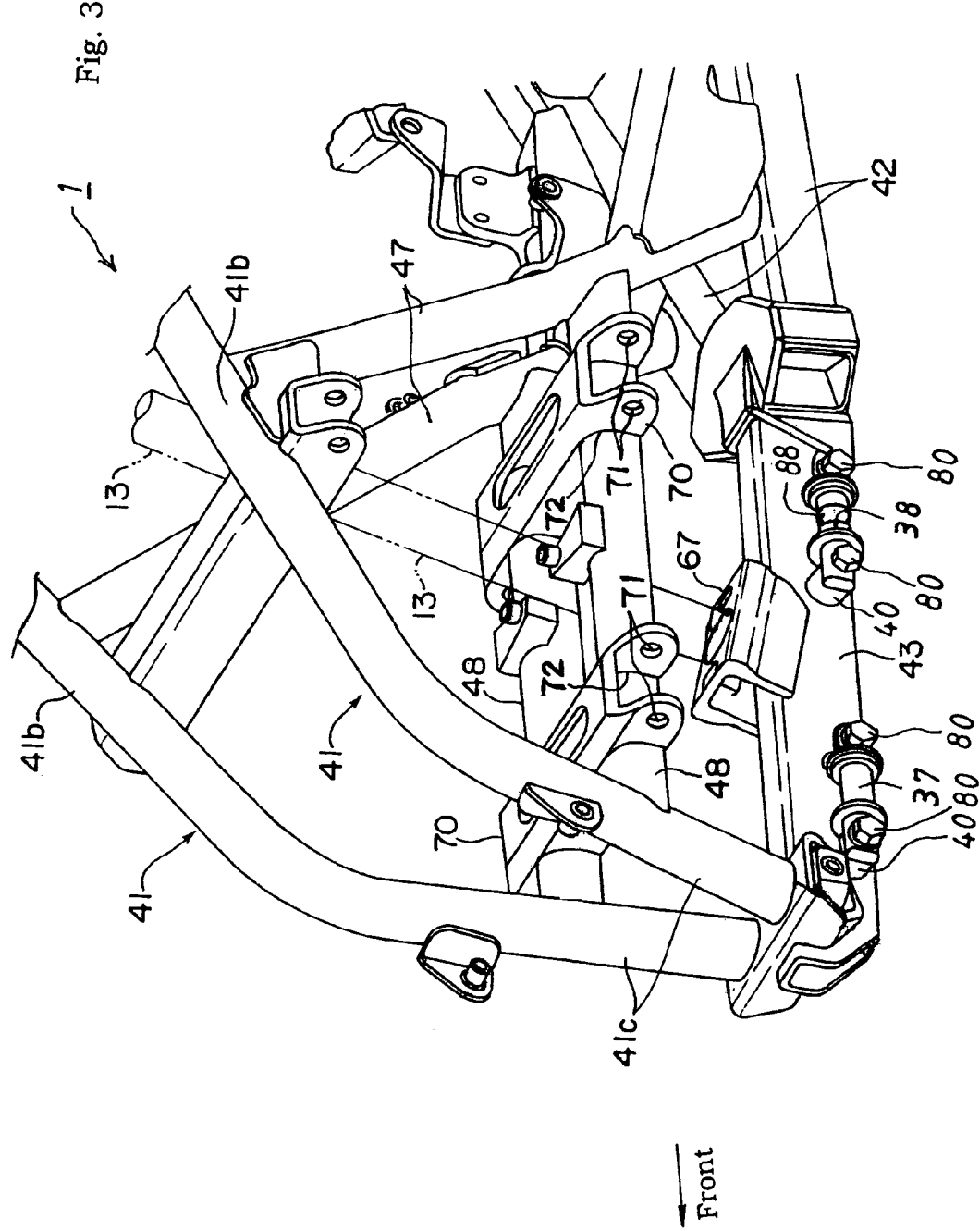
FIG. 3 is an enlarged perspective view of a body frame of the four wheeled vehicle in FIG. 1.

FIG. 3 is an enlarged perspective view of a front of the body frame 1. In FIG. 3, the front frame member 43 is formed in a rectangular pipe shape having a cross sectional shape in which a dimension in a vertical direction is longer than a dimension in a vehicle width (lateral) direction. The front frame member is arranged approximately at the center position of the vehicle width so as to extend in a longitudinal direction, and is slightly inclined in a forward upward direction. A shaft support portion 67 for supporting a lower end of the steering shaft 13, which has a C-shaped cross sectional shape, is fixed to an upper surface of the front frame member 43 by welding.

A pair of right and left center frame members 48 are slightly inclined in a forward upward direction so as to be in parallel to the front frame member 43. Both of front and rear ends of the center frame member 48 are respectively connected to the front end portion 41c of the upper frame member 41 and an intermediate stay member 47 by welding. The intermediate stay member 47 connects an upper portion 41b of the upper frame member 41 and the lower frame member 42 by welding. A pair of front and rear suspension arm support brackets 70 for supporting the upper suspension arms is bridged over both the center frame members 48. The suspension arm support bracket 70 has a pair of right and left notches 72 corresponding to the cross sectional shape of the center frame member 48. The notches 72 of the suspension arm support bracket 70 are fitted to the right and left sides of center frame member 48 from above, and are welded to the center frame member 48. The suspension arm support bracket 70 has a pair of pin support holes 71 at both ends thereof and as shown in FIG. 1, a base of each of the upper suspension arms 25 is secured in the pin support hole 71 (FIG. 3) with a bolt 31, so as to freely swing upward and downward.

[Structure of the Lower Suspension Arm]

Figure 4:
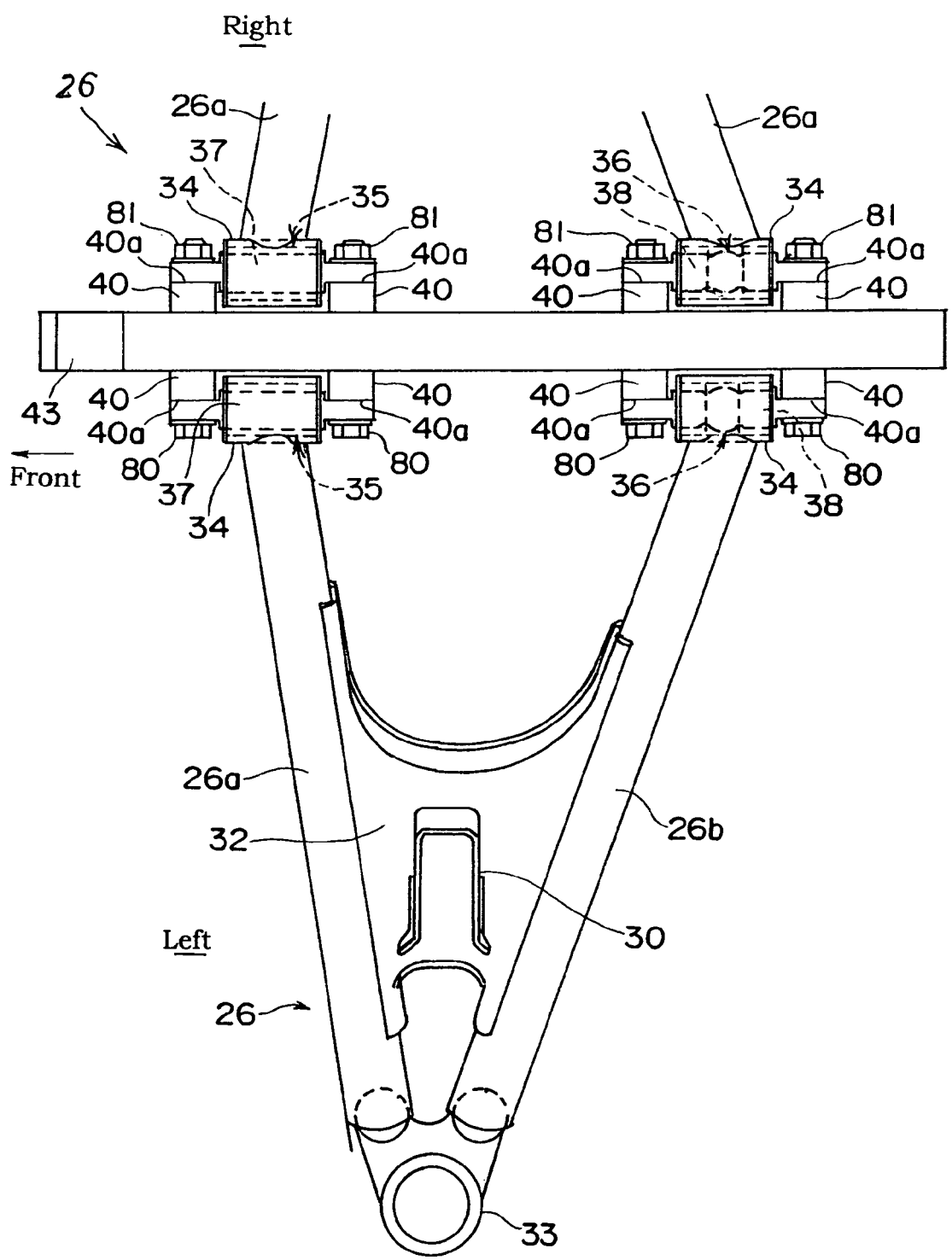
FIG. 4 is a plan view of a lower suspension arm in FIG. 1.

In FIG. 4, showing a plan view of the lower suspension arm 26, the lower suspension arm 26 comprises a pair of front and rear arm members 26a and 26b which open in V-shape toward a center of the vehicle width, thereby the lower suspension arm 26 is formed into a A-shaped (or V-shaped) as mentioned above. Middle portions of the front and rear members 26a and 26b are connected to each other through the connecting plate 32 by welding. The structure of the right and left lower suspension arms 26 comprises cylindrical bases 34 of the arm members 26a and 26b, four suspension arm support shafts 37 and 38, arm mounting portions 40, and bolts 80 and nuts 81, etc. The bases 34 are fixed to inner ends (base ends) of the front and rear members 26a and 26b respectively by welding, and outer ends of the front and rear members 26a and 26b are coupled to each other through a king pin support boss 33 by welding. The suspension arm support shafts 37 and 38 are supported in the bases 34 respectively via bearings 35 and 36, so as to rotate relatively with respect to the bases 34. The arm mounting portions 40 are welded to right and left sides of the front frame member 43. The front and rear suspension arm support shafts 37 and 38 are fixed to end faces 40a of the arm mounting portions 40 respectively by the bolts 80 and nuts 81. A head of the bolt 80 and the nut 81 clamp the arm mounting portions 40 and ends of the suspension arm support shafts 37 and 38 from the right and left sides, as described below.

Figure 5:
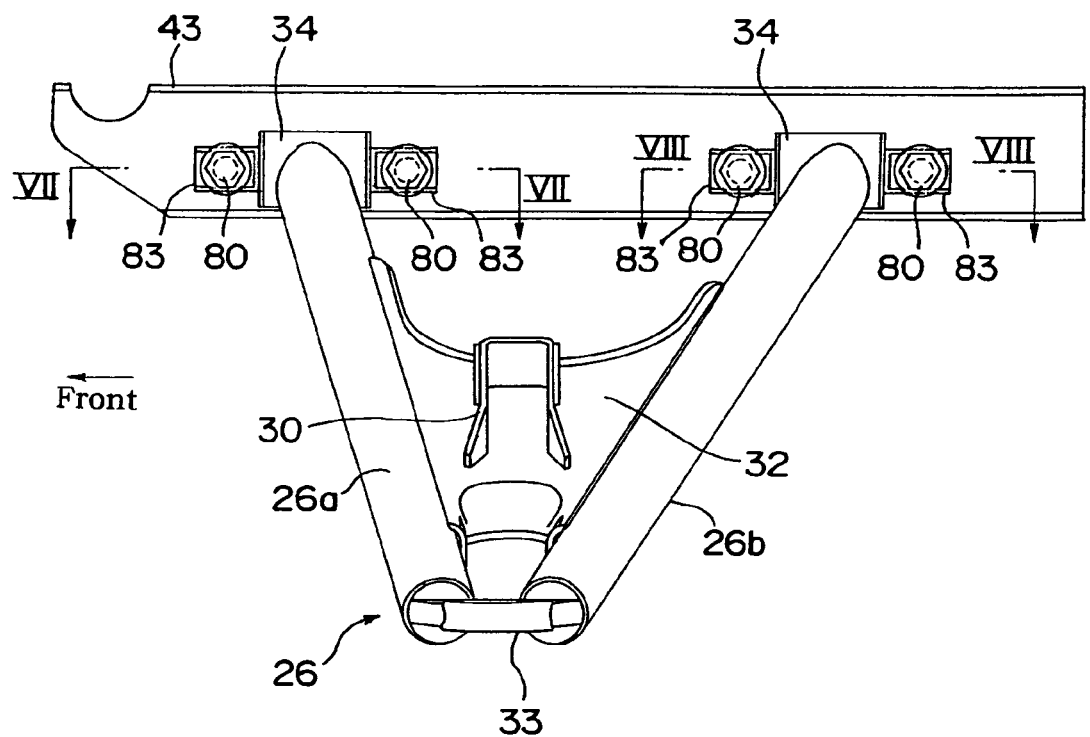
FIG. 5 is a left side view of the lower suspension arm in FIG. 1.

In FIG. 5, showing a left side view of the lower suspension arm 26, a bracket 30 for supporting a front shock absorber is fixed to, and extends upwardly from an upper surface of the connecting member 32.

Figure 7:
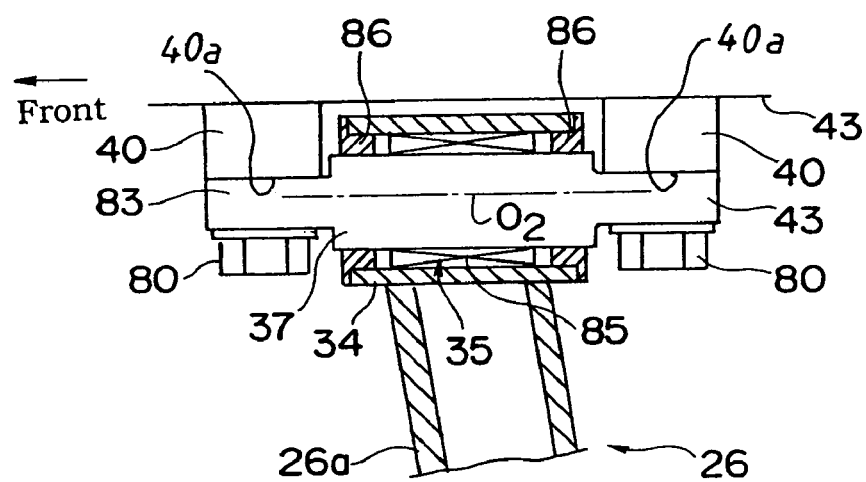
FIG. 7 is an enlarged horizontal sectional view (along a line VII-VII of FIG. 5) of a front base of the lower suspension arm.

In FIG. 7, showing a left side view of the base 34 of the front arm member 26a, the suspension arm support shaft 37 is inserted into the cylindrical base 34. The needle bearing 35 has a lot of needles (rolling members) 85 between an inner peripheral surface of the base 34 and an outer peripheral surface of the suspension arm support shaft 35. The needles 85 are arranged in parallel with an axis O2 of the suspension arm support shaft 37. Moreover, a pair of front and rear annular seals 86 is arranged between the inner peripheral face of the base 34 and an outer peripheral face of the suspension arm support shaft 37 at front and rear ends of the base 34.

Figure 9:
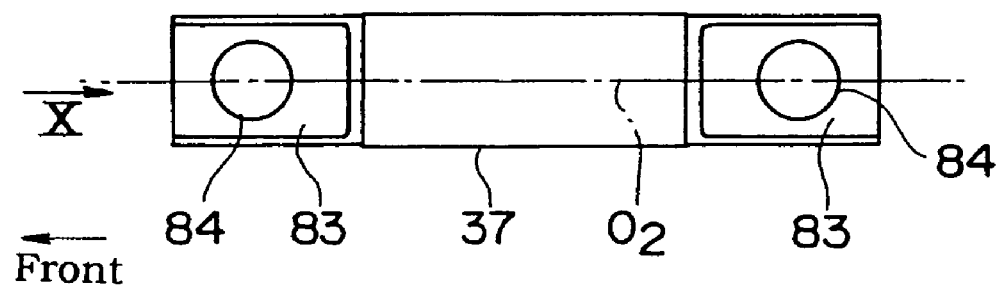
FIG. 9 is a left side view a front suspension arm support shaft in FIG. 7.
Figure 10:
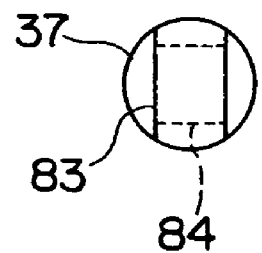
FIG. 10 a view as seen from an arrow X of FIG. 9.

FIG. 9 is a side view of the front suspension arm support shaft 37, and FIG. 10 is a view as seen from an arrow X of FIG. 9. As shown in FIG. 9, a pair of mounting bosses 83 is formed integrally with the suspension arm support shaft 37 at front and rear ends respectively. As shown in FIG. 10, each of the bosses 83 is formed in a shape of a thick walled plate by cutting both sides of the suspension arm support shaft 37 in parallel each other. As shown in FIG. 9, bolt insertion holes 84 are formed in the bosses 83 respectively. The bolt insertion holes 84 penetrate respectively the bosses 83 so as to be perpendicular to an axis O2 of the suspension arm support shaft 37. Moreover, a center line of the insertion hole 84 is located at a right angle to a planar mounting face of the boss 83.

Figure 8:
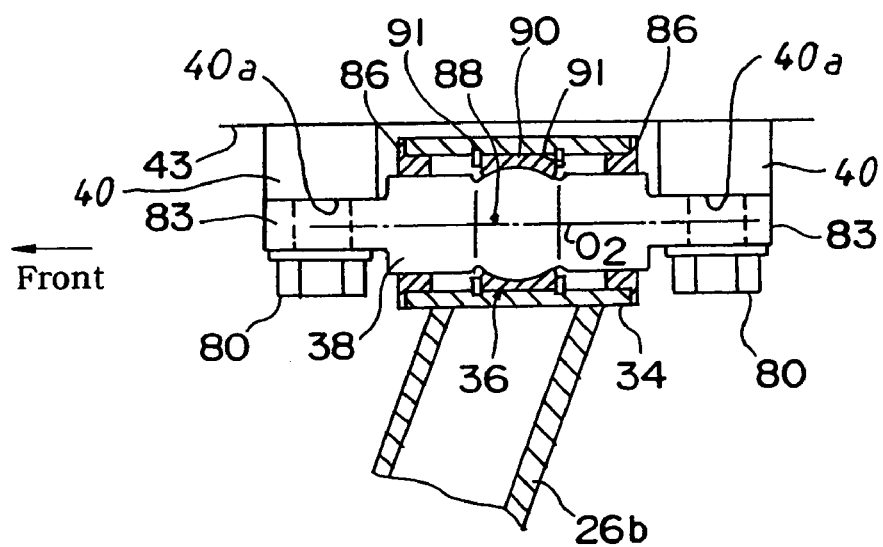
FIG. 8 is an enlarged horizontal sectional view (along a line VIII-VIII of FIG. 5) of a rear base of the lower suspension arm.

FIG. 8 is an enlarged horizontal sectional view of the base 34 of the rear arm member 26b of the lower suspension arm 26. As shown in FIG. 8, the pillow ball type bearing 36 is installed between an inner peripheral surface of the base 34 and an outer peripheral surface of the suspension arm support shaft 38. The pillow ball bearing 36 comprises of a spherical pillow portion 88 formed integrally with the suspension arm support shaft 38 at a middle position in the backward and forward direction thereof, and an outer race 90 having a spherical concavity to be fitted on an outer peripheral surface of the pillow ball portion 88. The outer race 90 is fitted in an inner peripheral surface of the base 34, and both of the front and rear end faces of the outer race 90 are engaged with snap rings 91 so that the outer race 90 does not move in the axial direction of the suspension arm support shaft. Moreover, a pair of annular seals 86 is installed between the inner peripheral surface of the base 34 and the outer peripheral surface of the suspension arm support shaft 38. One of the annular seals 86 is arranged at a front end of the base 34, and another of the annular seals 86 is arranged at a rear end of the base 34.

Figure 11:
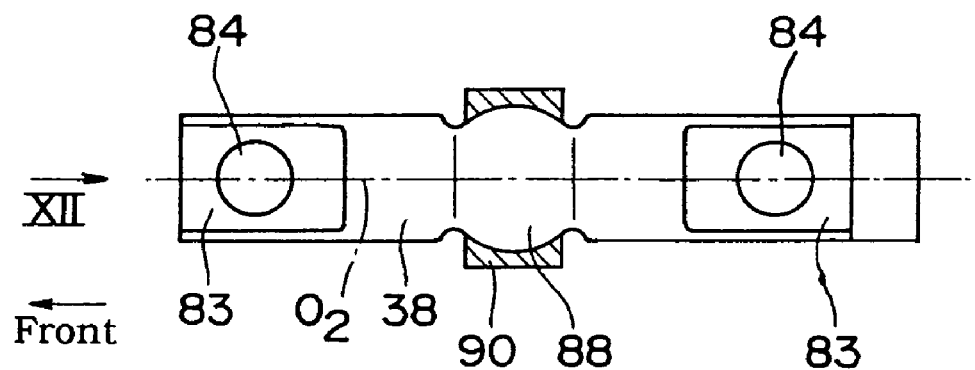
FIG. 11 is a left side view a rear suspension arm support shaft with a pillow ball bearing in FIG. 8.
Figure 12:
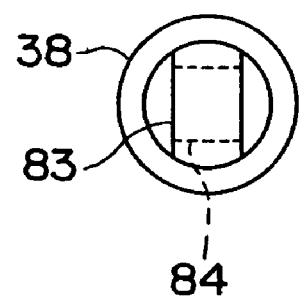
FIG. 12 is a view as seen from an arrow XII of FIG. 11.

FIG. 11 is a side view of the rear suspension arm support shaft 38 shown in FIG. 8, and FIG. 12 is a view (a front view) as seen from an arrow XII of FIG. 11. As shown in FIG. 11, a pair of mounting bosses 83 is formed integrally with the rear suspension arm support shaft 38 at front and rear ends respectively. As shown in FIG. 12, each of the bosses 83 is formed in a shape of a thick walled plate by cutting off both sides of the suspension arm support shaft 38 in parallel to each other. As shown in FIG. 11, the bolt insertion holes 84 are formed in the bosses 83 respectively. The bolt insertion holes 84 penetrate respectively the bosses 83 so as to be perpendicular to the axis O2 of the suspension arm support shaft 38. Moreover, a center line of the insertion hole 84 is located at a right angle to a planar mounting face of the boss 83.

[Mounting Structure of Lower Suspension Arm]

Figure 6:
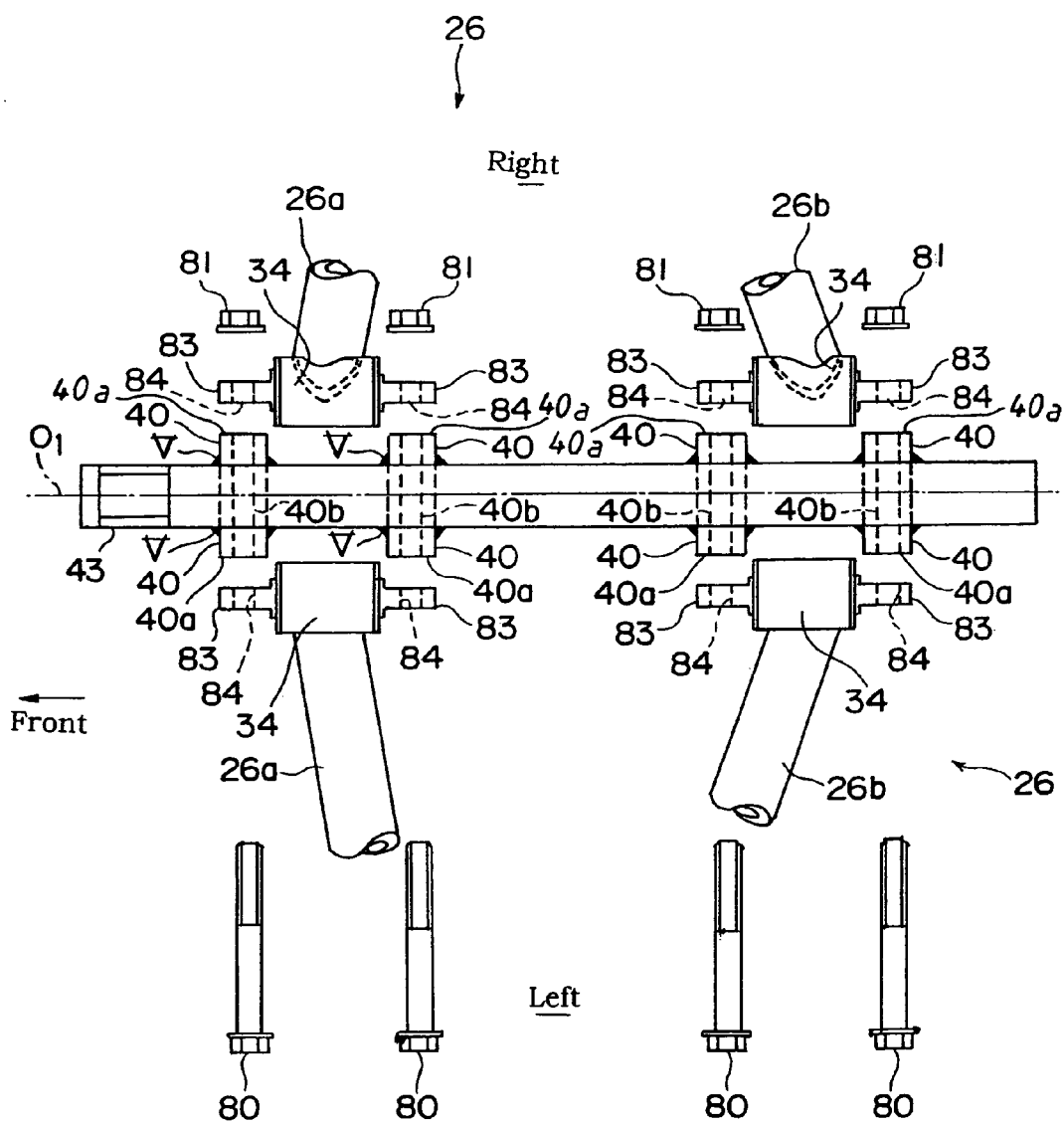
FIG. 6 is an exploded plan view of the lower suspension arm in FIG. 1.

In FIG. 6, showing an exploded plan view of the lower suspension arm 26, each of the arm mounting portions 40 is constituted by a cylindrical or tubular member such as a collar, and right and left end portions of the cylindrical member are utilized for the arm mounting portions 40 respectively. The cylindrical member has two mounting portions 40, is perpendicular to a center line O1 of the vehicle body width (center line of the single front frame 43 in plan view), and penetrates the front frame member 43 on the right and left sides. Both end portions (mounting portions 40) of the cylindrical member protrude uniformly from the right and left side surfaces of the front frame member 43, and are utilized for right and left arm mounting portions 40 respectively, as mentioned above. The cylindrical member constituting the mounting portions 40 is fixed to the front frame member 43 by welding (V).

Each of the bosses 83 of the suspension arm support shafts 37 and 38 is put on each of right and left end surfaces (side end surfaces) 40a of the arm mounting portions 40, and the bolts 80 are inserted into the bolt insertion holes 84 of the bosses 83 and the inner holes 40b of the cylindrical members respectively from the right or left direction. Then, as shown in FIG. 4, the nuts 81 are screwed on the bolts 80 respectively, whereby, both of the right and left suspension arm support shafts 37 and 38 are clamped together between the heads of the bolts 80 and the nuts 81.

[Assembling Work]

(1) As shown in FIGS. 7 and 8, the needle bearing 35 and the pillow ball bearing 36 are installed beforehand installed in the bases 34 of the lower suspension arm 26. With the bearings installed, as shown in FIG. 6, the bases 34 are moved toward the right and left end surfaces 40a of the arm mounting portions (cylindrical members) 40 from right and left sides respectively, and the bosses 83 are put on the arm mounting portions 40 respectively.

(2) The bolts 80 for right and left are inserted into the bolt insertion holes 84 of the bosses 83 of the left bases 34, the inner holes 40b of the arm mounting portions 40, and the bolt insertion holes 84 of the bosses 83 of the right bases 34, in this order, and the nuts 81 are screwed on the right end portions of the bolts 80 respectively. Thereby, both of the right and left suspension arm support shafts 37 and 38 are clamped together between the heads of the bolts 80 and the nuts 81 via the cylindrical members (arm mounting portions 40).

Figure 17:
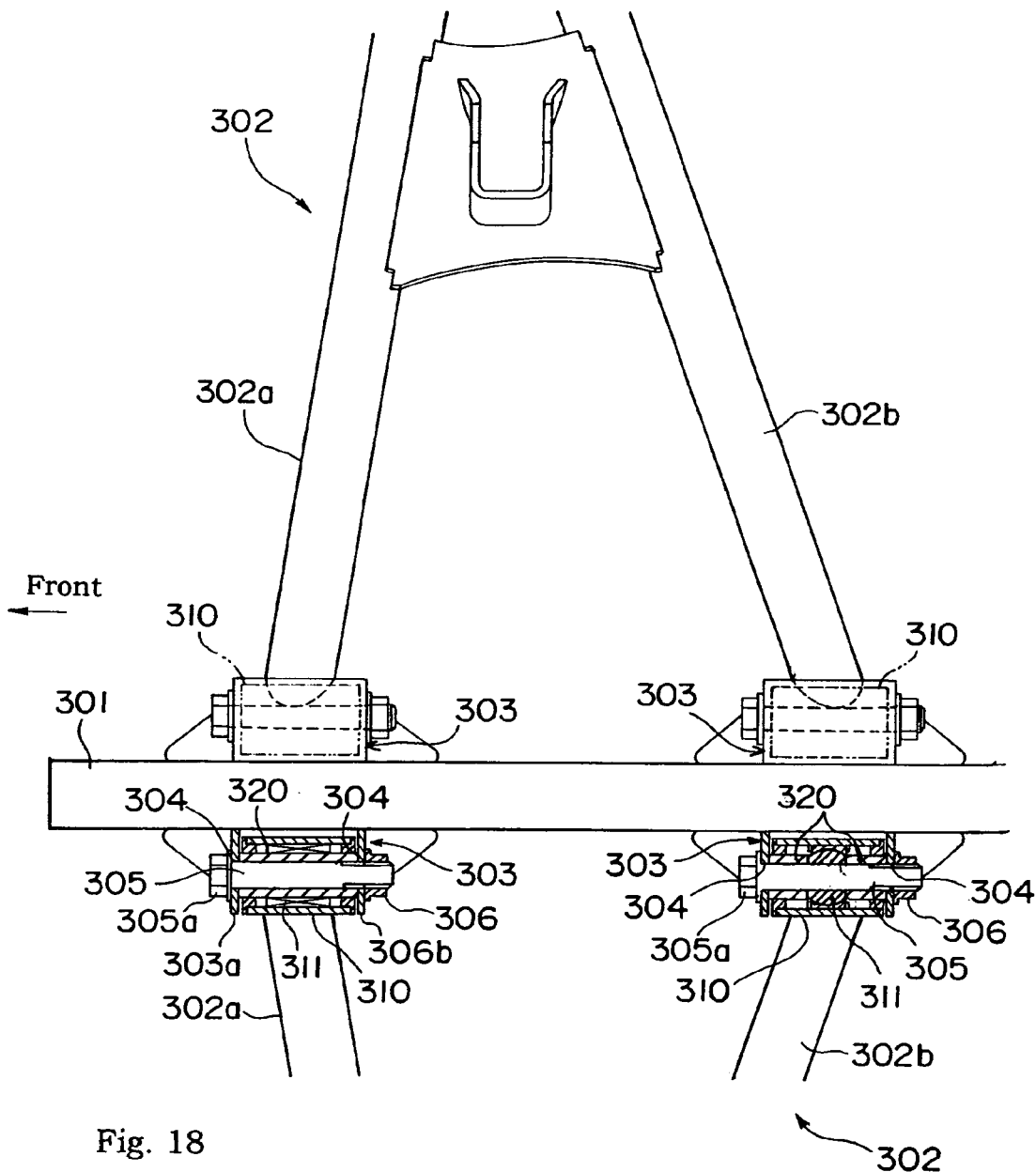
FIG. 17 is a plan view of the prior art.
Figure 18:
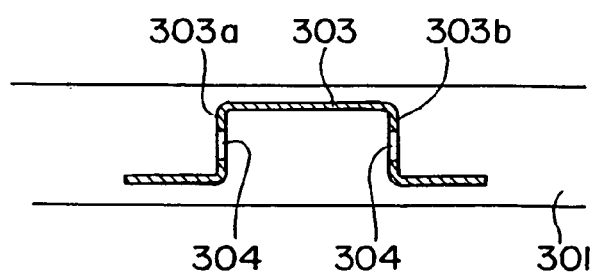
FIG. 18 is a left side view of the arm mounting portion illustrated in FIG. 17.

EFFECTS OF THE EMBODIMENT (1) In accordance with the above-mentioned assembling structure of the lower suspension arms 26 as shown in FIG. 6, in comparison with the prior art shown in FIG. 17 in which the suspension arm support shaft 305 is inserted from the front or rear of the vehicle into the bracket 303 and the bearing 311 so as to clamp them at the front and rear, since the bases 34 of the lower suspension arms 26 and the bolts 80 as shown in FIG. 6 are installed in the right and left side faces of the front frame member 43 from right and left sides, it becomes possible to obtain a wide or large space for assembly at the right and left sides of the front frame member 43. Thus, it becomes possible to easily assemble the lower suspension arms 26, and an assembling property of the lower suspension arm 26 improves.

(2) In accordance with the above-mentioned structure of the arm mounting portions 40, as shown in FIG. 4 and FIG. 6, in which the right and left end portions of the single cylindrical member penetrating the front frame member 43 are utilized for the right and left mounting portions 40 respectively, it becomes possible to reduce the number of the parts for the arm mounting portion. Moreover, since the tensile loads or compression loads acting on the lower suspension arms 26 in right and left direction are carried only by the arm mounting portions 40, a strong vehicle body frame 1 capable of withstanding the above mentioned loads can be obtained, and the weight of the vehicle body frame 1 can be reduced.

(3) In the above-mentioned embodiment, as shown in FIG. 9 and FIG. 11, since the bosses 83 are formed integrally with the suspension arm supports 37 and 38, it becomes possible to reduce the number of parts for the bosses 83.

(4) In the above-mentioned embodiment, as shown in FIG. 3, since the supporting bracket 70 for the upper suspension arm 25 is bridged between the right and left center members 48 and 48, the supporting bracket 70 serves as a cross reinforcement member, and as a result, rigidity of the right and left center frame members 48 and 48 becomes higher. Moreover, since the supporting bracket 70 can be used on the right or left side, the number of parts for supporting the upper suspension arm 25 can be reduced, and mounting the upper suspension arm 25 becomes easy.

(5) In the above-mentioned embodiment, as shown in FIG. 8, since the pillow ball portion 88 of the pillow ball type bearing 36 is formed integrally with the suspension arm support shaft 38, an inner structure of the base 34 can be simplified, and the number of parts for the pillow ball type bearing 36 can be reduced.

(6) In the above-mentioned embodiment, as shown in FIG. 7, since the outer peripheral surface of the suspension arm support shaft 37 is utilized for an inner race of the needle bearing 35, and the inner peripheral surface of the base 34 is utilized for an outer race of the needle bearing 35, an inner structure of the base 34 can be simplified, and the number of parts for the needle bearing 35 can be reduced.

Figure 13:
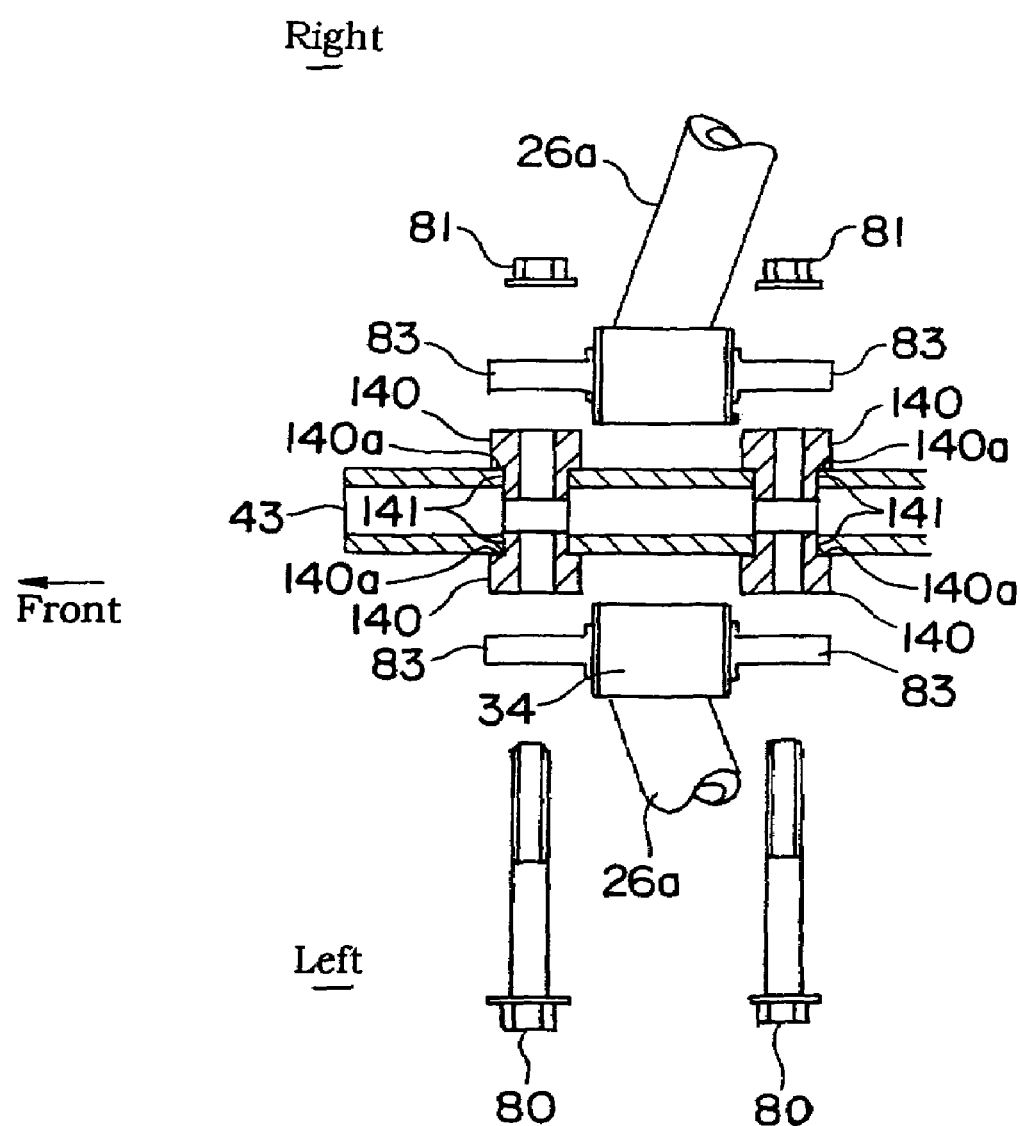
FIG. 13 is an exploded plan view of the second embodiment of the wheel suspension arm mounting structure of the present invention in which a part of the structure is shown in horizontal sectional view.

OTHER EMBODIMENTS (1) FIG. 13 shows the second embodiment of the present invention. As shown, a right arm mounting portion 140 and a left arm mounting portion 140 are independently fixed to the right face and the left face of the front frame member 43. Each of the right and left arm mounting portions 140 has an annular shoulder or step 140a at outer peripheral surface thereof. The left arm mounting portion 140 is inserted from left side into a mounting hole 141 formed in the front frame member 43, and the right arm mounting portion 140 is inserted from right side in the same mounting hole 141, and each of the annular shoulders 149a is put on each of the side faces of the front frame member 43, and is fixed to the front frame member 43 by welding. The other structure of the second embodiment is identical to the structure of the first embodiment illustrated in FIG. 4 and FIG. 6, and identical components and parts are identified with identical reference numerals.

Figure 14:
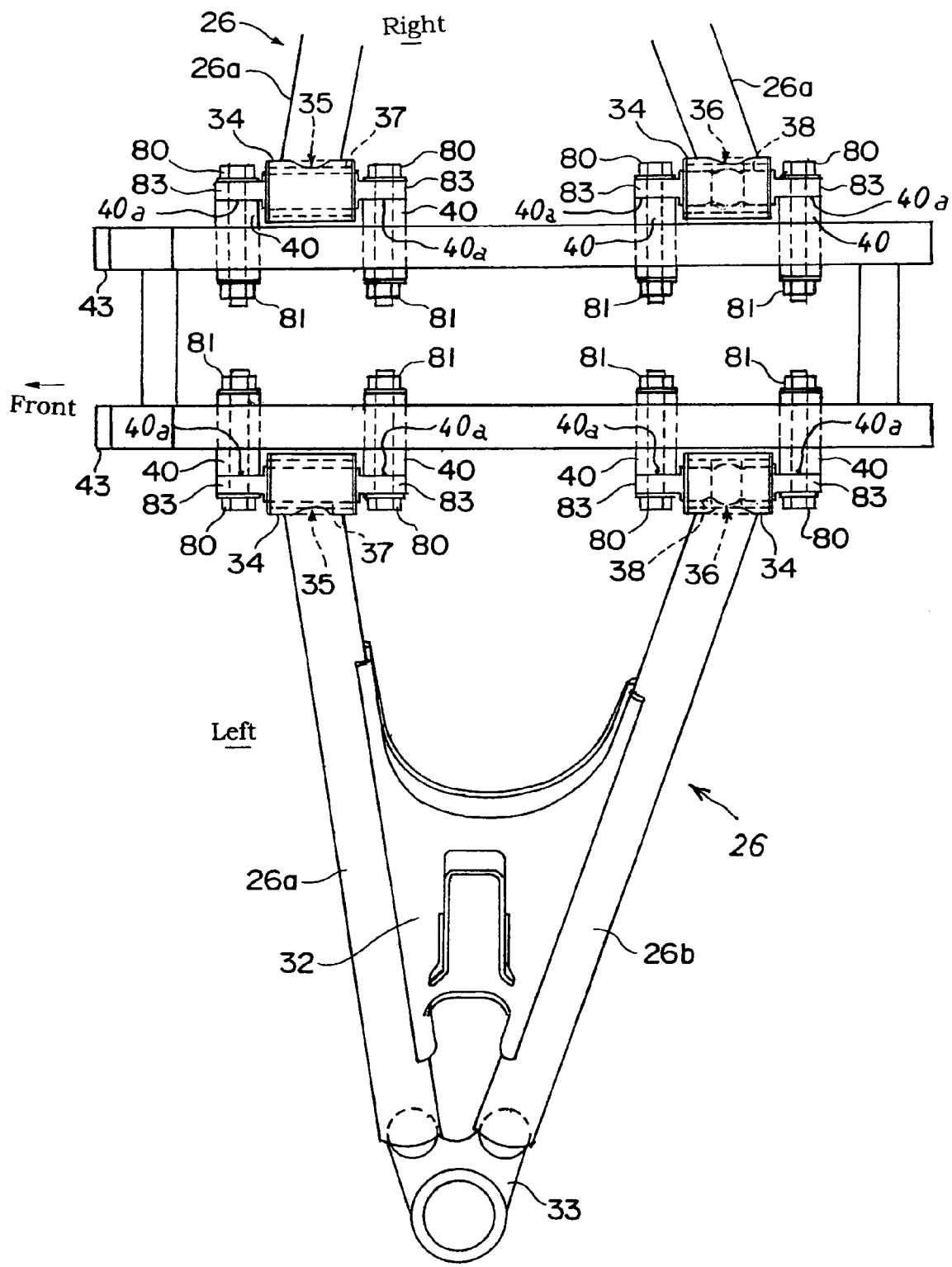
FIG. 14 is a plan view of the third embodiment of the suspension arm mounting structure of the present invention.

(2) FIG. 14 shows the third embodiment of the present invention. As shown, there is a pair of right and left front members 43 and 43. The base 34 of the left lower suspension arm 26 is mounted on a left side surface of the left front frame member 43, and the base 34 of the right lower suspension arm 26 is mounted on a right side surface of the right front frame member 43. Each of the bases 34 is provided with a pair of front and rear arm mounting portions 40, a pair of front and rear bolts 80, and a pair of front and rear front nuts 81. The structure of the third embodiment is identical to the structure of the first embodiment illustrated in FIG. 4 and FIG. 6, and identical components and parts are identified with identical reference numerals.

Figure 15:
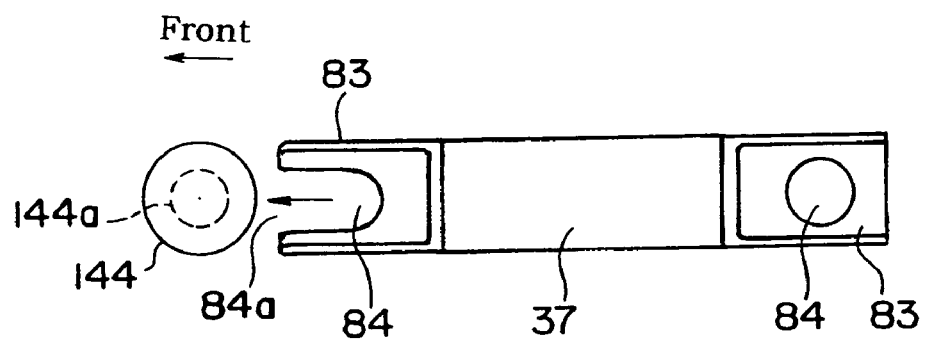
FIG. 15 is a side view of a suspension arm support shaft of the fourth embodiment of the wheel suspension arm mounting structure of the present invention.
Figure 16:
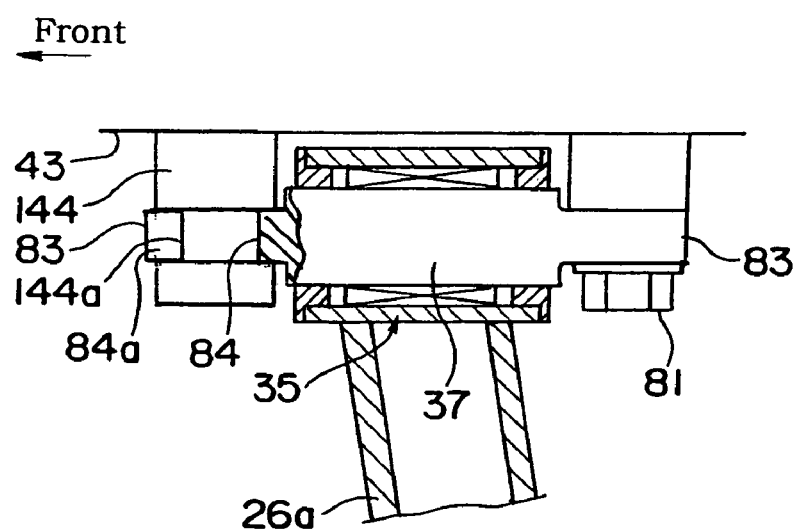
FIG. 16 is an enlarged horizontal sectional view of an arm mounting portion with the suspension arm support shaft of FIG. 15.

(3) FIG. 15 and FIG. 16 show the fourth embodiment of the present invention. As shown in FIG. 15, one of the front and rear bosses 83 of the suspension arm support shaft 37, for example the front boss 83 in the case of this embodiment, is opened forward. In other words, an opening 84a is formed to a front end of the insertion hole 84 of the front boss 83. A solid shaft member, instead of the cylindrical member or tubular member constituting the arm shaft support portion 40, is utilized as a front arm mounting portion 144, and an annular groove 144a is formed along an outer peripheral surface of the arm mounting portion 144. As shown in FIG. 16, the insertion hole 84 having the opening 84a is engaged with the annular groove 144a of the front arm mounting portion 144, and only the rear mounting portion 83 is clamped by the bolt 80 and the nut (not shown) from both of right and left sides. In accordance with the structure of the fourth embodiment, several of parts for clamping for example bolts and nuts, can be omitted, and the number of the bolts and the nuts can be reduced.

(4) In the structure shown in FIG. 14, it may be possible to form a female thread portion within the inner hole of the cylindrical arm mounting portion 40, and screw the bolt 80 into the female thread portion so that the nut 81 can be omitted.

(5) Although all of the above mentioned embodiments are applied to the suspension arm 25 and 26 for the front wheel, the structure of the present invention can be applied to a suspension arm for the rear wheels in the case that the right and left wheels are suspended independently. Moreover, the suspension arm of the present invention includes a swing arm like as a rigid axle type.

Although the invention has been described in its preferred embodiments with a certain degree of particularity, it will be apparent to those skilled in the art that many changes and variations are possible. It is therefore to be understood that the present invention may be practiced in other manners other than those specifically described herein without departing from the scope and spirit thereof.

What is claimed is:

1. A wheel suspension arm mounting structure for a vehicle comprising:
   a vehicle body frame member;
   at least one arm mounting portion attached to said vehicle body frame member; and
   a suspension arm for supporting a wheel of the vehicle, said suspension arm being mounted to said arm mounting portion so as to be freely swingable upward and downward relative to said vehicle body frame member, said suspension arm comprising one or more arm members, wherein each of said one or more arm members includes:
   a suspension arm support shaft;
   a substantially cylindrical base coupled to an outer peripheral surface of said suspension arm support shaft, so as to be rotatable relative to said suspension arm support shaft;
   a first mounting boss extending from a first end of said suspension arm support shaft in an axial direction of said suspension arm support shaft; and
   a second mounting boss extending from a second end of said suspension arm support shaft in the axial direction, wherein said first mounting boss and said second mounting boss each define a bolt insertion hole bored in a direction perpendicular to said suspension arm support shaft to allow a bolt to be inserted in a direction perpendicular to a longitudinal axis of said suspension arm support shaft to fix said suspension arm support shaft to said arm mounting portion.

2. The wheel suspension arm mounting structure for a vehicle according claim 1, wherein said first mounting boss and said second mounting boss are integral with said suspension arm support shaft.

3. The wheel suspension arm mounting structure for a vehicle according to claim 1, wherein:
   said suspension arm comprises a first arm member mounted to a right side surface of said vehicle body frame member and a second arm member mounted to a left side surface of said vehicle body frame member;
   a plurality of said arm mounting portions traverse said vehicle body frame member, each of said arm mounting portions being fixed to said vehicle body frame member such that a first end face of each of said arm mounting portions projects from the right side surface of said vehicle body frame member, and a second end face of each of said arm mounting portions projects from the left side surface of said vehicle body member; and
   said suspension arm support shaft of said first arm member is mounted to said first end face of each of said arm mounting portions, and said suspension arm support shaft of said second arm member is mounted to said second end face of each of said arm mounting portions.

4. The wheel suspension arm mounting structure for a vehicle according to claim 3, wherein each of said arm mounting portions comprise a cylindrical member having a penetrating hole positioned to receive a bolt inserted into and passed through one of said bolt insertion holes.

5. The wheel suspension arm mounting structure for a vehicle according to claim 2, further comprising a bearing installed between said base of said suspension arm and said suspension arm support shaft, wherein the outer peripheral surface of said suspension arm support shaft forms an inner race of said bearing.

6. A wheel suspension arm mounting structure for a vehicle comprising:
   a vehicle body frame member;
   first and second arm mounting portions attached to said vehicle body frame member;
   a first suspension arm for supporting a wheel of the vehicle, said first suspension arm being mounted on a right side of said first and second arm mounting portions so as to be freely swingable upward and downward relative to said vehicle body frame member; and
   a second suspension arm for supporting a wheel of the vehicle, said second suspension arm being mounted on a left side of said first and second arm mounting portions so as to be freely swingable upward and downward relative to said vehicle body frame member, said first and second suspension arms comprising at least one arm member, wherein each of said arm members of said first and second suspension arms includes:
   a suspension arm support shaft;
   a substantially cylindrical base coupled to an outer peripheral surface of said suspension arm support shaft, so as to be rotatable relative to said suspension arm support shaft;
   a first mounting boss extending from a first end of said suspension arm support shaft in an axial direction of said suspension arm support shaft; and
   a second mounting boss extending from a second end of said suspension arm support shaft in the axial direction, wherein said first mounting boss and said second mounting boss each define a bolt insertion hole bored in a direction perpendicular to said suspension arm support shaft to allow a bolt to be inserted in a direction perpendicular to a longitudinal axis of said suspension arm support shaft to fix said suspension arm support shaft to said arm mounting portion.

* * * * *

UNITED STATES PATENT AND TRADEMARK OFFICE
CERTIFICATE OF CORRECTION

| | |
|---|---|
| PATENT NO. | : 7,523,951 B2 |
| APPLICATION NO. | : 11/488151 |
| DATED | : April 28, 2009 |
| INVENTOR(S) | : Sosuke Kinouchi et al. |

It is certified that error appears in the above-identified patent and that said Letters Patent is hereby corrected as shown below:

TITLE PAGE,

Item (73), change Assignee to -- Kawasaki Jukogyo Kabushiki Kaisha, Hyogo, Japan --.

Signed and Sealed this

Twenty-third Day of June, 2009

JOHN DOLL
*Acting Director of the United States Patent and Trademark Office*